United States Patent [19]

Johnson

[11] 3,727,102

[45] Apr. 10, 1973

[54] SELECTION AND ADDRESSING CIRCUITRY FOR MATRIX TYPE GAS DISPLAY PANEL

[75] Inventor: William E. Johnson, Toledo, Ohio

[73] Assignee: Owens-Illinois, Inc., Toledo, Ohio

[22] Filed: Aug. 3, 1970

[21] Appl. No.: 60,402

[52] U.S. Cl. ..........................315/169 R, 315/169 TV

[51] Int. Cl. ..............................................H05b 37/00

[58] Field of Search ........................315/169, 169 TV

[56] References Cited

UNITED STATES PATENTS 3,499,167 3/1970 Baker et al. ..........................315/169

3,513,327 5/1970 Johnson............................315/169 X

*Primary Examiner*—Roy Lake

*Assistant Examiner*—Lawrence J. Dahl

*Attorney*—Donald K. Wedding

[57] ABSTRACT

There is disclosed a collection and addressing diode-resistor logic matrix for row column conductor arrays in a gas discharge display and memory panel wherein the alternating sustaining currents from the panel are caused to bypass the logic circuits in returning to the sustaining signal source by a diode for each conductor in the row-column conductor array.

3 Claims, 2 Drawing Figures

WILLIAM E. JOHNSON, INVENTOR

BY E. J. Holler & D. K. Wedding

ATTORNEYS

SELECTION AND ADDRESSING CIRCUITRY FOR MATRIX TYPE GAS DISPLAY PANEL

BACKGROUND AND BRIEF DESCRIPTION OF THE INVENTION

It has been proposed to use a diode-resistor logic or coincidence network for addressing row and column conductors locating discrete discharge sites in a gas discharge display/memory device of the type disclosed in Baker et al. U.S. Pat. No. 3,499,167. In such prior proposed systems, the gate diodes must be forward biased with a greater current than expected per conductor (row or column) line due to the sustainer voltage or else they will turn-off for a portion of the cycle of the sustainer. The sustainer signal current will go through the logic resistor or the logic diode to a line and hence consume power. Moreover, such systems require a constant bias potential to be applied to the diode; and the resistor in such circuits must be chosen to be such that the effect on the sustaining generator and the drop across the resistance is ineffective with regard to the operation of the panel.

In accordance with the present invention, the selection or gate diodes are pulsed and a bypass for the sustainer current to and from the panel is provided around the resistor-diode logic circuitry. By adding the bypass diodes, the cutting off of the gate diode for a portion of the cycle is prevented and, in addition, the bias on the diodes can be a pulse generator so that the line pulse generators create a "window". The bias pulse generator, therefore, can be a voltage regulated stable generator to furnish the turn-on signal and, no bias current as such is required; the sustaining signal has a low impedance path and the resistors for the diode-resistor logic circuits can be chosen independent of the sustaining voltage required.

BRIEF DESCRIPTION OF THE DRAWING

The above and other objects, advantages and features of the invention will become more apparent from the following specification when considered with the accomplished drawing wherein.

BRIEF DESCRIPTION OF THE INVENTION

Figures 1, 2:
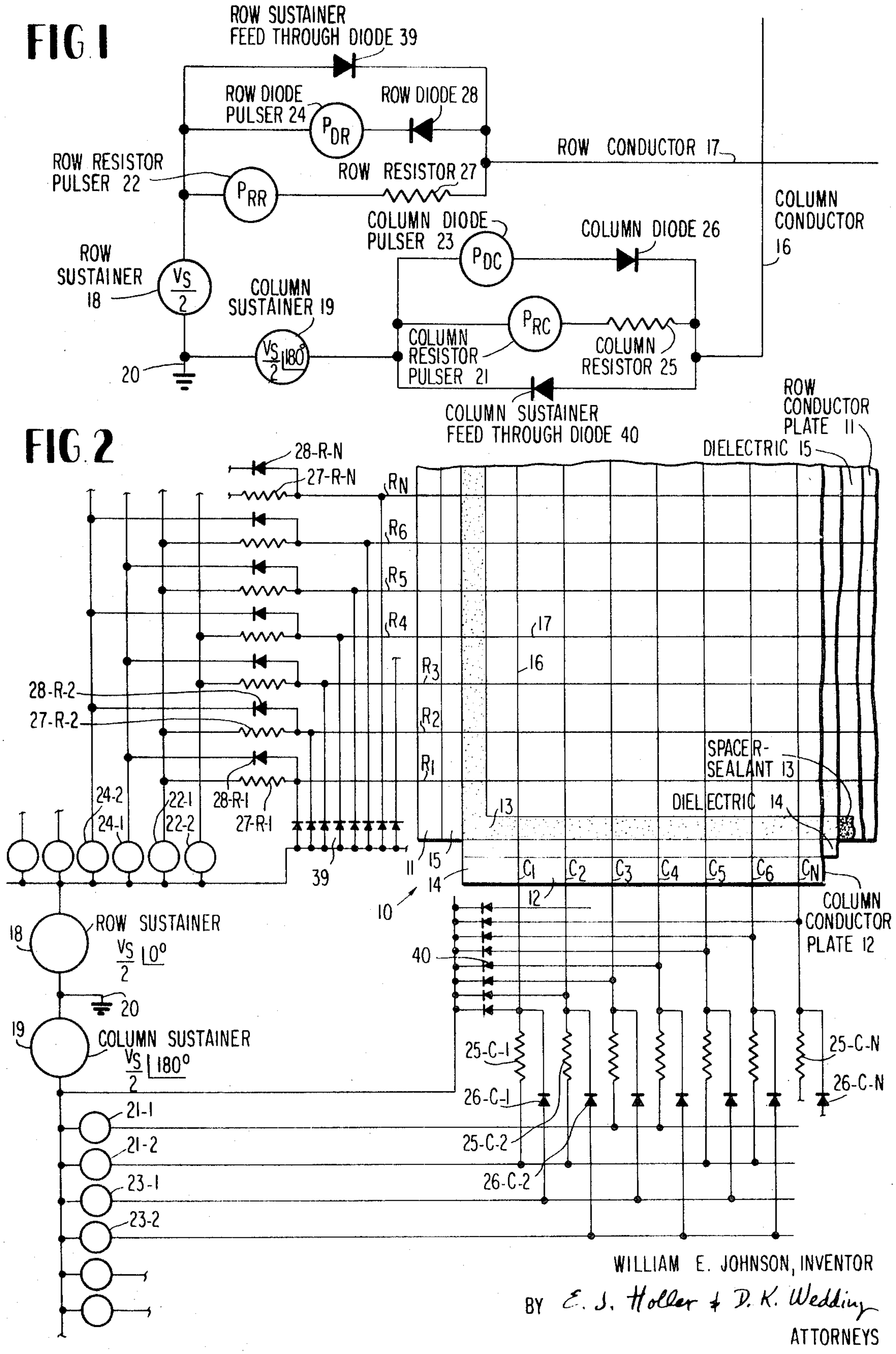
FIG. 1 illustrates a single row conductor logic circuit and a single column conductor logic circuit incorporating the invention.
FIG. 2 is a schematic diagram of the invention as applied to a plurality of row and column diode-resistor matrices for selecting one or more discrete discharge sites in a gas discharge panel.

The invention is concerned with diode-resistor selection and addressing matrices for gas discharge panels of the type shown in Baker et al. U.S. Pat. No. 3,499,167 in which, following an initial discharge as located by selected dielectrically coated row-column conductors, charges are produced which are collected and stored on the dielectric at discrete sites, which charges serve, first, to terminate the discharge and then, on reversal of a polarity of the applied periodic sustaining voltage, aid or augment the applied sustaining voltage to initiate a second discharge which is likewise quenched by the stored charges. This sequence is repeated on the next half and each suceeding half cycle of applied sustainer potential once the initial discharge has been caused by a firing voltage which can be a voltage pulse algebraically added to the sustainer voltage. Termination of the sequence of discharges is by a second voltage pulse algebraically added to the sustainer voltage. For a disclosure of the timing aspects of the pulsing signals with respect to the sustaining generator reference is made to Johnson et al. application Ser. No. 699,170 entitled "Interfacing Circuitry and Method for Multiple Discharge Gaseous Display and/or Memory Panels" now U.S. Pat. No. 3,618,071 which is assigned to the same assignee as the present invention. As described in the referenced patent application of Johnson et al. the sustainer voltage is of a magnitude which is insufficient to initiate discharges but of a sufficient amplitude to sustain discharges once initiated.

It is with respect to specific circuitry for selecting individual row and column conductors that the present invention is concerned and, more particularly, with respect to improvements on a suggestion by others of the use of a diode-resistor matrix for selecting individual column conductors and individual row conductors, and still more particularly, the present invention is concerned with the use of a diode circuit tied to each row and each column conductor, respectively, for bypassing the resistor-diode selection and matrix and pulsing circuits associated therewith. Referring now to FIG. 1, there is disclosed a single column conductor 16 and a single row conductor 17 which are provided with row sustainer voltage source 18 and column sustainer voltage source 19 which, as indicated are operated at 180° phase relationship so that the sustainer voltages applied to the row conductor can be one-half of the necessary sustainer voltage required to sustain discharges at a selected discharge site and the sustaining voltage applied to the column conductor 16 can be one-half that necessary to sustain the discharges that the selected row conductor-column conductor cross point, the sustainer voltages applied being periodic potentials which are continuously applied to the row and column conductors all as described in the above referenced Johnson et al. patent application. As is known, the sustainer voltages may be sinusoidal, trapazoidal, squarewave, or triangular or any other periodic wave shape which is continuously applied to the row and column conductors. For a disclosure of a sustaining generator which is particularly useful in this environment, reference is made to the application of E. M. Murley, Ser. No. 755,930 entitled "Solid State Multi-Phase High Voltage Generator" which is incorporated herein by reference.

As illustrated in FIG. 1, row conductor 17 is provided with a row diode pulser 24 which is in series circuit with a row diode 28 and a row resistor pulser 22 which is in series with row resistor 27. Row resistor 27 and row diode 28 along with their respective pulsers are connected in parallel with the intermediate point between row diode 28 and row resistor 27 serving as the connection point to row conductor 17. The common ends of row diode pulser 24 and row resistor pulser 22 are connected to the output terminal of row sustaining generator 18.

The diode-resistor selection circuitry for column conductor 16, except for the poling of its diode, and relative polarity of potentials applied thereto is identical to the circuitry for row conductor 17. Thus, column diode pulser 23 is connected in series circuit with column diode 26 and column resistor pulser 25 is connected in series circuit with column resistor 26 with the common junction point between column diode 26 and column resistor 25 being connected directly to column conductor 16. The common junction between column diode pulser 23 and column resistor pulser 25 is connected directly to the output terminal of column sustainer generator 19 which, it should be noted, is at 180° phase relationship relatiVe to row sustaIner generator 18. It will be appreciated that this phase relationship may be reversed, the objective being to supply one-half the necessary sustaining potential on column conductor 16 and one-half the necessary sustainer potential on row column conductor 17. It should also be noted that there is a ground connection 20 intermediate the row sustainer 18 and column sustainer 19 which in essence results in the logic circuitry and logic pulsers per se floating on the sustainer potentials, that is, the entire address system floats on top of the sustainer wave form. The row diode pulser circuits 24, the row resistor pulser circuit 22, the column diode pulser circuits 23 and the column resistor pulser circuit 25 may be of the type disclosed in my U.S. Pat. No. 3,513,327 entitled "Low Impedence Pulse Generator Circuit". As an alternative, the voltage pulser circuits may be of the solid state type. Moreover, the type and power capability of the resistor pulsers may be different, if desired, from the diode pulsers.

Summarizing, the junction point between row diode 28 and row resistor 27 is connected to row conductor 17 and by controlling the pulse voltages at this junction, simultaneously with the controlling of the pulse voltage at the junction of column diode 26 and cOlumn resistor 25, the discharge condition of the gas at the intersection of row conductor 17 and column conductor 16 may be manipulated on and off in conjunction with the sustainer voltages from row sustainer 18 and column sustainer 19. Thus, through the coincidence of pulses on resistor 27 and diode 28 from pulser 22 and pulser 24, respectively, along with the coincidence of pulses on column resistor 25 and column diode 26 by column resistor pulser 21 and column diode pulser 23 results in pulse voltages algebraically added to the sustainer voltages on the column conductor 16 and row conductor 17, respectively. The times of occurrence of said pulses relative to the sustainer potential is as described in the above-referenced Johnson et al. patent application. In brief, such pulses are algebraically added to the sustainer voltages at the above-referenced diode-resistor junction points to manipulate the discharge condition of the gas at the selected cross point. It should be noted at this point that the above-described concept removes the so-called "line at a time" address scheme; however, section at a time and discharge unit at a time address (e.g., random access) is still possible so that alpha-numeric addressing can be easily accomplished.

As described earlier herein, in the coincidence circuitry proposed by others, the gate diodes e.g., row diode 28 and column diode 26, must be forward biased with a greater current than expected per line due to the sustainer voltage or else they will turn-off for a portion of the cycle. Thus, in order to avoid this requirement and to enable pulsing of the row diode 28 by row pulser 24, there is provided a row sustainer feed through diode 39 and a column sustainer feed through diode 40 which bypass the logic circuitry in the manner illustrated. This allows the bias to be a pulse generator such as the row diode pulser 24 and the column diode pulser 23 so that the line pulser generator (pulsers 24 and 26) can create a window during which time the line can be energized.

Without feed through diodes 39 and 40, the sustaining signals from sources 18 and 19 would go through either the resistor or the diode (row diode 28, row resistor 27, or column diode 26 or column resistor 25) to the line conductors 16 and 17. Since the current from the sustaining generator is an alternating current, the current through the resistor and the diode must be greater than the sustainer current in order to inhibit back bias of diode 28 and diode 26. By addition of the row sustainer feed through diode 39 and column sustainer feed through diode 46, no continuous bias current is required and the sustaining signal voltage current has a lower impedance path to the line and the resistors 27 and 25, respectively, can be chosen independently of the sustainer voltage required.

The single row conductor and single column conductor circuitry illustrated in FIG. 1 is shown in its somewhat expanded form for driving a plurality of column conductors 16 (C-1, C-2 . . . C-N) and a plurality of row conductors 17 (R-1, R-2, . . . RN) formed on a gas discharge panel as described in the aforementioned Baker et al. patent. Such a panel 10 includes a row conductor plate 11 and a column conductor plate 12 which are joined by a spacer sealant means 13, the row conductors 17 on row conductor plate 11 being covered or coated with an insulating or dielectric coating 15 and a similar dielectric coating 14 being applied to column conductors 16 on column conductor plate 12. The spacer sealant 13 in conjunction with the opposed surfaces of dielectric coatings 14 and 15 form the bounding surface walls of a thin gas discharge chamber in which a plurality of discharges can take place.

As illustrated, there is one feed through diode 39 for each row conductor 17 and one feed through diode 40 for each column conductor 16. While there is a row resistor 27-R-1 and a row diode 28-R-1 for each row conductor and a similar or corresponding arrangement for each column conductor, it should be noted that the row diode pulsers and the row resistor pulsers are connected in a pattern or matrix decode arrangement so that a fewer number of these pulsing circuits may be required in order to fully manipulate the discharge condition of selected sites of the panel. Thus, resistor pulser 22-1 is connected to row conductor 17-R-1, 17-R-2 and 17-R-5 and 17-R-6 whereas row resistor pulser 22-2 is connected to row conductors 17-R-3 and 17-R-4. However, the diode row pulsers 24-2 and 24-1 are connected to alternate row diodes. Thus, row diode pulser 24-1 pulses diode 28-R-1, diode 28-R-3 and so on whereas row diode pulser 24-2 is connected to row diode 28-R-2, 28-R-4 and so on. It will be noted that there are several unnumbered pulsers to the left of the row pulsers just described which additional pulsers may be connected and used to repeat the pattern and complete the pulsing system for the logic network connected to the row conductor array 17. The identical arrangement is shown foR column conductors 16 so this need not be described in detail. It will be appreciated that the signals supplied to pulsers 22, 24 and 21 and 23 are all in accordance with information from a computer or like system as described in the patents and applications referred to earlier Thus, in order to select the discrete discharge point located by row conductor R-2 and column conductor C-2, row diode pulser 24-2 and row resistor pulser 22-1 are pulsed simultaneously with the pulsing of column resistor pulser 21-2 and column diode pulser 23-2. It should be noted that the opposite polarity pulses are produced on the conductors which coact with the opposite phase or polarity of the sustainer voltages.

The bypass or sustainer feedthrough diodes 39 and 40 are each connected to an individual conductor and bypass the resistor-logic circuit and return directly to the row sustainer voltage source 18 and the column sustainer voltage source 19, respectively. It should be noted once again that without the diodes 39 and 40, the sustainer voltages would return either through the resistors 27 and 25 or through the diodes 26 and 28 and the address and selection circuitry. This avoids consumption of power in the diode and resistor circuits. In addition, no bias current is required for the selection diodes since now the sustainer can go through the diodes for one-half of the cycle thereof and, the column diodes can be pulsed.

Having thus described the invention, it will be apparent that various modifications may be made to the invention without departing from the scope thereof as set forth in the claims appended hereto.

What is claimed is:

1. In a gas discharge panel having a plurality of dielectrically coated parallel row conductors and a plurality of dielectrically coated column conductors for carrying discharge condition manipulating voltage pulses and alternating sustaining potentials to selected row-column conductor cross-points, and a diode-resistor logic matrix in which each junction between the connected ends of a diode and a resistor in the logic matrix is connected to one of said conductors, respectively, and the coincidence of a selectively applied voltage pulse on the resitor end from a resistor pulse source and a a selectively applied control signal on the end from a diode central signal source, opposite each said junction, respectively, is effective to cause the voltage pulse on said resistor to appear on the conductor connected to said junction, the improvement comprising, non linear circuit means for bypassing the alternating sustaining potential around the diode-resistor elements in said logic matrix for a portion of the cycle of said alternating sustaining potential.

2. The invention defined in claim 1 wherein said non-linear circuit element is a diode, there being at least one diode connected to each panel row and column conductor and having the like electrode thereof commonly connected to each for the rod and column conductor, respectively, and means connecting said common connection to the source of said sustainer potential.

3. The invention defined in claim 2 wherein there are a plurality of said resistor pulse sources individually connected to selected ones of resistors in said matrix and a plurality of diode logic pulse sources connected to selected individual logic diode elements, said resistor pulse sources and said diode logic element pulse sources being connected in a logic pattern to said resistors and said diodes, whereby the coincidence of pulses at selected diode-resistor common junction is effective to supply a discharge condition manipulating voltage pulse to the conductor connected thereto without applying a pulse potential to conductors which may be connected to diode-resistor logic elements having common junctions connected to unselected conductors on the panel.

* * * * *